G. S. DAVISON.
FURNACE LINING.
APPLICATION FILED JULY 7, 1916.
1,210,431.
Patented Jan. 2, 1917.
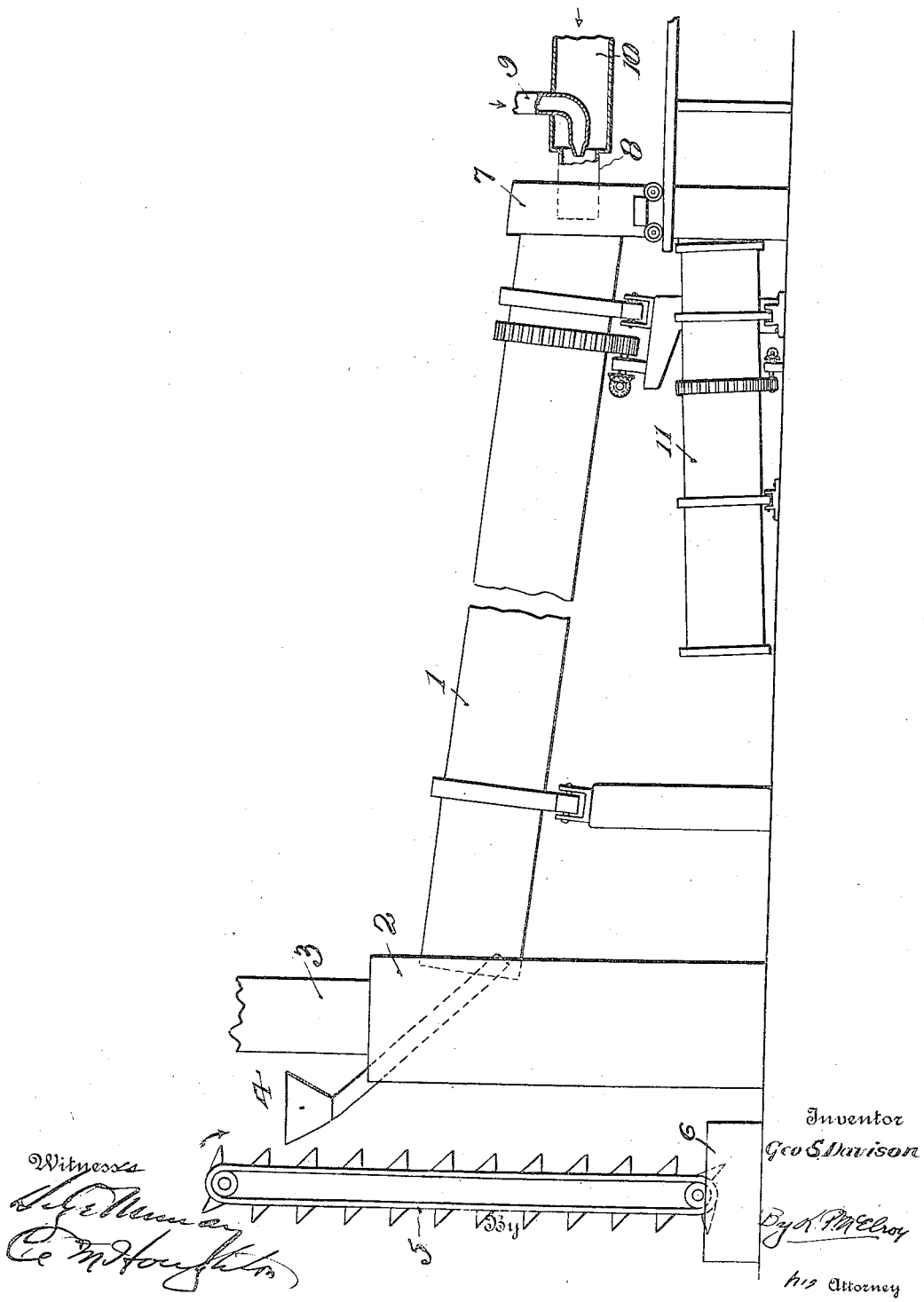
Inventor
Geo. S. Davison
Witnesses

UNITED STATES PATENT OFFICE.

GEORGE S. DAVISON, OF PITTSBURGH, PENNSYLVANIA, ASSIGNOR TO ALLEN S. DAVISON COMPANY, OF PITTSBURGH, PENNSYLVANIA, A CORPORATION OF PENNSYLVANIA.

FURNACE-LINING.

1,210,431.  Specification of Letters Patent.  Patented Jan. 2, 1917.

Application filed July 7, 1916. Serial No. 108,043.

*To all whom it may concern:*

Be it known that I, GEORGE S. DAVISON, a citizen of the United States, residing at Pittsburgh, in the county of Allegheny and State of Pennsylvania, have invented certain new and useful Improvements in Furnace-Linings, of which the following is a specification.

This invention relates to furnace linings; and it comprises as a new article of manufacture a granular mass of matter composed of granules of substantial size of hard burnt dolomitic or magnesian lime, magnesia or other refractory material, each such granule being saturated or impregnated with a more fusible, silicious, iron-containing material, such as basic open hearth slag, such silicious material being substantially all contained in the pores of the granule and the faces of such granule being substantially free of any coating, glaze or layer of such silicious material; and it further comprises a method of making such a material wherein crushed or granulated dolomite or magnesian limestone is burnt (advantageously in a rotary kiln) at a very high temperature, a temperature of at least 3100 degrees F. or higher, and during the period of exposure to the very high temperature is agitated in the presence of an amount of basic slag or other (relatively speaking) fusible, silicious iron-containing material which is merely that which can be taken up by the voids or pores of such granules, the period of exposure of the granules and of the more fusible silicious material to such high temperature being such as will insure the fused silicious material entering the pores of the granules by capillary attraction without leaving a residue or coating of any substantial extent on the exterior of the granule; all as more fully hereinafter set forth and as claimed.

In what is known as the basic open hearth method of refining iron and steel, the metal is treated in a molten condition in a reverberatory furnace by the conjoint influence of an oxidizing flame and of a basic material, lime. Under the influence of the flame the iron and its impurities undergo an oxidation and the acid constituents, phosphorus, sulfur, silicon, etc., are oxidized to the corresponding acid bodies which unite with the lime to form "basic open hearth slag"; a material which melts, ordinarily, at about 2900 degrees F. although it sinters at lower temperatures. The temperature in the furnace is in excess of this degree so that the slag is liquid. The problem of lining furnaces of this character has been a serious one in the iron industry for many years. A suitable lining must, of course, be of basic material, to prevent attack by oxid of iron, the lime used in purifying, etc.; but on the other hand, while basic, it must not be subject to attack to any great extent by the acid bodies formed in the oxidation of the impurities of the iron, that is, silica, phosphoric acid, etc. Further, the lining must be of considerable mechanical strength in order to retain its place against the washing action of the iron, etc. The material must bond together in some way under the influence of the heat to give this mechanical strength; but it must not be otherwise substantially affected, of course, by the heat. The combination of characters is hard to obtain. The best materials which have been hitherto found are certain grades of rather impure magnesia from native magnesites. Pure magnesia is refractory; neither softening or melting at any temperature here involved; and it is a basic body, while at the same time it has no great tendency to flux and waste away with the acid bodies produced in the oxidizing treatment of the iron. But pure magnesia is so refractory that it cannot be used as a lining since its particles do not bond in the furnace. The particular varieties of magnesia which have been found suitable are those which contain a certain amount of silica and iron; just enough of these bodies to produce under the heat of the furnace a slight degree of sintering throughout the granules and at their meeting faces. A lining of this material in place consists in granules of magnesia in more or less open arrangement, united only at their meeting faces and with voids between them. In use, the voids on the surface of the lining of course fill up with basic slag, but the voids farther removed from the surface do not, and remain open. The varieties of magnesite which are suitable to this purpose are not common and are relatively costly. Very many efforts have been made to produce cheaper materials having approximately the same qualities; but most of the substitutes hitherto proposed have been open to one objection or another.

One substitute often proposed is granulated hard burnt dolomitic lime or magnesian lime,—a more or less variable mixture of lime and magnesia which has been exposed to such a high temperature as to shrink it and harden it. The shrunk dolomitic lime has even better mechanical properties as regards strength and rigidity than the magnesite; but it is susceptible to the influence of the atmosphere, taking up carbon dioxid and moisture; that is, it tends to slake. It must therefore be used at once after burning. And it does not bond well in the furnace; a lining of hard burnt dolomite granules tamped into place cannot be regarded as permanent until enough basic slag has flowed into the spaces between the granules to make the whole into a sort of concrete in which the binder or matrix is slag; and the aggregate, dolomite granules. And however well it may be tamped into place the proportion of voids, and consequently of slag, in the finished lining is considerable. As the slag is freely fluid at the furnace temperature the disadvantage of this is obvious. In the effort to accelerate this lining-forming operation it has been proposed to make granular mixtures of dolomitic lime with enough granular basic slag to form the binder or matrix without depending on the furnace operation. Another proposition is to coat the dolomite granules with basic slag with the idea of making a sealing coating; an impermeable coating which will shield the interior of the granule and prevent slaking actions in storage or transportation. But neither of these propositions has been completely successful; and this is for the reason that the amount of slag necessary in both is too great. In use, either the mixed granules or the coated granules form a lining which is, like that previously described, a sort of concrete with the interspaces between the lime granules full of slag. Such a lining contains too great a proportion of basic slag to make a highly desirable lining in the furnace. As stated, basic slag melts at 2900 degrees F. and the temperature of the furnace is considerably in excess of this. Therefore, with any such lining, the mixture tends to become more or less what may be described as "mushy"; the interior face of the lining is really a freely fluid layer of molten slag, stiffened somewhat by the presence of the infusible dolomite granules. This is disadvantageous mechanically, and there is the further objection that the dolomite granules being, in effect, suspended in a fluid bath of basic slag, chemical action takes place; in short, a lining of the character described, is not as refractory as it should be. Although it contains the highly refractory burnt dolomite granules, yet as a whole it is not much more refractory than the fluid basic slag. I have discovered that these previous propositions for the use of basic slag and similar silicious bonding for dolomitic lime materials were wrong in principle, since the effort was in all cases to have the bonding material present between the faces of the granules; in such a manner and such quantity as to fill the voids between the several grains. It is not desirable in a good lining to have any such quantity of bonding agent present. The granules should be cemented at their meeting faces by a hard and rigid union; but at the point of union there should not be any substantial amount of the foreign bonding material; there should not be enough to form a liquid film of substantial thickness between the meeting faces at even the highest temperature of the furnace. In substance, granule should be united to granule in the furnace lining without the interposition of more fusible material, spacing them apart, and subject to displacement by molten slag. In the present invention, therefore, I restrict the amount of bonding agent to such an amount as will merely suffice at most to fill the pores and crevices of the granule and produce an impregnation of the granule as distinguished from any coating thereof; performing the impregnating operation at such a high temperature that the agent employed is freely fluid and maintaining this temperature sufficiently long to insure substantially the entire amount of such agent entering the pores by capillary or molecular attraction. In so doing, it is my object not to leave any substantial film or coating layer of the agent on the exterior of the granule, since, for reasons previously stated, this would militate against the quality of the lining produced from the treated granules. I have found that with the pores impregnated as stated, the granules will bond at meeting faces in the furnace without any necessity for the presence of any substantial layer or film of the agent on such faces.

As the refractory granule, I may use dolomitic or magnesian lime, magnesia, lime, alumina, etc. Even quicklime is suitable for the present purposes since the pores are filled and air cannot enter to slake the material. I have found that an amount of basic slag and similar binder which is sufficient substantially to fill the voids of the granules is not enough to impair the refractory qualities of dolomitic lime to any material extent.

In a specific embodiment of the present process, using dolomite or magnesian limestone and basic slag, dolomite is crushed to about the size of granule desired, finer material being sifted out. With the granular material thus produced is mixed about 8 or 9 per cent. of fine powdered basic open hearth slag or a corresponding amount of other equivalent agents. Basic slag contains silicate of iron; and I find that almost any material containing or capable of forming iron silicate will answer. As one of the equivalent agents I may mention silicious iron ores, and particularly those of such composition as to resemble basic open hearth slag; mill cinder; etc. Any material containing both iron and silica and fusible at not too low a temperature will answer; and I contemplate the use of any such material. The mixture of dolomite granules and powdered impregnated agent is fed into the upper end of a rotary kiln, or equivalent device and exposed to the action of a highly heated flame burning in aerial suspension; something like the flame in a cement kiln. But the temperatures here required are much higher than those used in cement kilns. A suitable flame of suitable temperature may be produced with powdered coal burning with superheated air; with natural gas burning with a good excess of air, etc. The mixture of granules and powder passes downward through the kiln under the heating influence of the flame and flame gases and a number of reactions occur. The dolomite is first calcined, that is, freed of its carbon dioxid, and is then shrunk, that is, rendered dense, hard and strong. It is however freely porous. When the temperature of the mixture under the influence of the radiant heat of the flame reaches 2900 degrees or higher, the slag melts freely and it is taken up or absorbed by the open pores of the lime, these pores being in large part formed by the expulsion of the carbon dioxid. I find that although the slag and most other agents I use will melt at 2800 or 2900 degrees F. it is advisable to use temperatures in excess of 3100 degrees in this incorporating operation so as to have a sufficiently thin liquidity of the slag to insure its freely entering the pores by capillarity without accumulating on the outside of the granules to form any substantial skin or coat. At too low a temperature it is apt to collect more or less on the surface instead of entering the pores. As stated, I desire to have the slag inside the granule and not outside. A good article when cooled has a uniform dark gray color while an excess of slag or a low-temperature operation gives granules of the black color of slag, the lighter colored lime not being visible through the coating. In this operation, the dolomite is usually crushed to fragments of about $\frac{1}{4}$th inch diameter which contract to about $\frac{3}{16}$ths. I have found that this size of granule at a temperature of 3100° F. or about, with the circumstances obtaining in the kiln operation, permits a tolerably uniform impregnation of the pores from side to side. With somewhat larger fragments or granules, conditions remaining the same, penetration to the center may not be complete. In the best embodiment of this invention, the impregnation is substantially the same throughout. The basic slag or other binder used should be so adjusted to the conditions that there will not be more than will be taken up by the pores of the basic material while there must still be enough to fill such pores with substantial completeness. The binder should be very finely powdered in order that it may melt quickly and be uniformly distributed. Under the described conditions of temperature and the like, any excess of binder, such an excess as would produce any substantial coating on the outside, will be revealed by more or less balling up of the material to form large aggregates. Where this happens, the balled up material is discarded; but a careful control of the relative amounts of binder and basic granules will prevent any such action.

In stating that the granules of material are free from any substantial outside coating or layer of binder, I wish it to be understood that I do not exclude the presence of some of the binder on the outside of the granule; enough, for instance, to produce a sort of very thin glaze; a glaze which is thin enough, in the case of basic slag, to allow the color of the dolomite to be seen therethrough. In the best type of material made under the present invention from a grayish white dolomitic lime and a black slag, the color of the fragment is a dark gray; this color being substantially the same on the exterior and on a freshly broken fracture. There is no visible appearance either of the light gray dolomite or of the black slag.

In the accompanying illustration I have shown more or less diagrammatically one type of apparatus which may be used in performing the present process.

The view is an elevation, partly in central vertical section, of an organization of apparatus elements embodying a rotary kiln.

In this showing, element 1 is a horizontal, rotary, slightly inclined cylinder entering at its upper end housing 2 provided with stack 3. Through this housing passes feed conduit 4 entering the upper end of the kiln and supplied with material by conveyer 5 from receptacle 6. At its lower end the kiln enters the usual type of movable housing 7. Through the front of this housing enters burner 8 fed with gas, which may be natural gas, at 10 and air at 9. Treated granules drop through this housing into rotary cooler 11.

In the use of the above described apparatus the kiln in its heated zones is maintained at a temperature of 3100° or above, which may be effected by supplying natural gas at 10 with plenty of air at 9. Granulated dolomite and fine powdered basic slag in the requisite proportions are supplied to 6 and taken thence by 5 for delivery through 3 into the upper end of the kiln. The dolomite in its passage down through the kiln is calcined, that is, deprived of its carbon dioxid, which leaves it porous, and it is then, under high heat, shrunk materially and rendered hard, dense and firm but without losing its porosity. The basic slag melts to a thin liquid which is taken up by the pores of the granules at or soon after the time the porosity develops. With the proper quantity of basic slag and with the right temperature the binder is all taken up in these pores, and the material passing from the hot zone will show substantially no local accumulation or skin or coating of slag; when cooled it will be of a uniform dark gray color without the black spots or surfaces which show the presence of what may be called "free slag", that is, slag existing otherwise than that absorbed in the pores of the material. The hot impregnated slag drops at 7 into cooler 11, which also serves as a preheater for air flowing up to the burning zone. Since the material made under this invention is very hot, return of air heated by the material in the cooler materially aids in producing the very high kiln temperatures here necessary.

In a 120-foot kiln having a diameter of 6 feet, ordinarily it requires from about two and a half to three hours for the material to pass from the feed end to the outlet end when the kiln is rotating at the rate of about 50 revolutions per hour.

The material coming from the rotary kiln may be cooled in any suitable manner. This is advantageously done in what is known as a clinker cooler in the cement art. The unusually high temperature of the treated material and the high temperature required in the operation, render the regeneration of heat by passing air over the material and then into the kiln very advantageous. The cooled material may be bagged, stored, etc., without fear of deterioration or atmospheric influences. When used in the open hearth furnace, under the heat of the furnace, the granules unite at their meeting faces to form an open textured lining, much like that which is formed by the best grades of magnesia from magnesite, but even superior to such a magnesia lining, for the reason that the union between the meeting faces, is, so to speak, positive, instead of the more or less accidental bonding occurring with these impure magnesites.

What I claim is:—

1. As a furnace lining, a mass of granular basic refractory material, the granules being impregnated with a relatively small amount of silicious material but having their faces free of any substantial layer of such silicious material.

2. As a furnace lining a mass of granular basic refractory material, the granules being impregnated with a relatively small amount of material containing iron and silica but having their faces substantially free of any substantial layer thereof.

3. As a furnace lining a mass of granular basic refractory material, the granules being impregnated with a relatively small amount of basic slag but having their faces substantially free of any substantial layer thereof.

4. As a furnace lining a mass of granular basic refractory material, the granules having their pores substantially filled with a relatively small amount of silicious material but having their faces relatively free of such silicious material.

5. As a furnace lining, a mass of granular basic refractory material, the granules having their pores substantially filled with a relatively small amount of material containing iron and silica but having their faces substantially free thereof.

6. As a furnace lining, a mass of granular basic refractory material, the granules having their pores substantially filled with a relatively small amount of basic slag but having their faces substantially free thereof.

7. As a furnace lining, a mass of granular hard burnt dolomitic lime, the granules being impregnated with a relatively small amount of silicious material but having their faces relatively free of such silicious material.

8. As a furnace lining a mass of granular hard burnt dolomitic lime, the granules being impregnated with a relatively small amount of material containing iron and silica but having their faces substantially free thereof.

9. As a furnace lining a mass of granular hard burnt dolomitic lime, the granules being impregnated with a relatively small amount of basic slag but having their faces substantially free thereof.

10. As a furnace lining a mass of granular hard burnt dolomitic lime, the granules having their pores substantially filled with a relatively small amount of silicious material but having their faces relatively free of such silicious material.

11. As a furnace lining, a mass of granular hard burnt dolomitic lime, the granules having their pores substantially filled with a relatively small amount of material containing iron and silica but having their faces substantially free thereof.

12. As a furnace lining, a mass of granular hard burnt dolomitic lime, the granules having their pores substantially filled with a relatively small amount of basic slag but having their faces substantially free thereof.

13. The process of making furnace lining material which comprises heating together a porous granular basic material with a small amount of a powdered fusible silicious material at a temperature sufficient to render the latter thinly fluid and maintaining the heat until such silicious material is substantially entirely absorbed within the pores of the granules.

14. The process of making furnace lining material which comprises heating together a porous granular basic material with a small amount of a powdered fusible material containing a silicate of iron at a temperature sufficient to render the latter material thinly fluid and maintaining the heat until such latter material is substantially entirely absorbed within the pores of the granules.

15. The process of making furnace lining material which comprises heating together a porous granular basic material with such an amount of a powdered fusible material as will suffice merely to fill the pores of such granular material without leaving an exterior excess, the heat being carried to such a temperature that such fusible silicious material will be rendered freely fluid enough to be taken up by the pores of such basic material with substantial completeness.

16. The process of making furnace lining material which comprises heating together a porous granular basic material with such an amount of a powdered fusible silicious material containing a silicate of iron as will suffice merely to fill the pores of such granular material without leaving an exterior excess, the heat being carried to such a temperature that such fusible silicious material will be rendered freely fluid enough to be taken up by the pores of such basic material with substantial completeness.

17. The process of making furnace lining material which comprises heating together a porous granular hard burnt dolomitic lime with a small amount of a powdered fusible silicious material at a temperature sufficient to render the latter thinly fluid and maintaining the heat until such silicious material is substantially entirely absorbed within the pores of the granules.

18. The process of making furnace lining material which comprises heating together a porous granular hard burnt dolomitic lime with a small amount of a powdered fusible material containing a silicate of iron at a temperature sufficient to render the latter material thinly fluid and maintaining the heat until such silicate of iron is substantially entirely absorbed within the pores of the granules.

19. The process of making furnace lining material which comprises heating together a porous granular hard burnt dolomitic lime with such an amount of a powdered fusible silicious material as will suffice merely to fill the pores of such granular material without leaving an exterior excess, the heat being carried to such a temperature that such fusible silicious material will be rendered freely fluid enough to be taken up by the pores of such hard burnt lime with substantial completeness.

20. The process of making furnace lining material which comprises heating together a porous granular hard burnt dolomitic lime with such an amount of a powdered fusible silicious material containing a silicate of iron as will suffice merely to fill the pores of such granular material without leaving an exterior excess, the heat being carried to such a temperature that such fusible silicious material will be rendered freely fluid enough to be taken up by the pores of such hard burnt lime with substantial completeness.

In testimony whereof, I affix my signature hereto, July 6, 1916.

GEORGE S. DAVISON.